(12) United States Patent
Brown et al.

(10) Patent No.: US 11,841,265 B2
(45) Date of Patent: Dec. 12, 2023

(54) HETEROGENEOUS SUBSURFACE IMAGING SYSTEMS AND METHODS

(71) Applicants: Massachusetts Institute of Technology, Cambridge, MA (US); The Trustees of Boston University, Boston, MA (US)

(72) Inventors: Stephen Brown, Montpelier, VT (US); Thomas Szabo, Newburyport, MA (US); Daniel R. Burns, North Falmouth, MA (US); Michael Fehler, Boston, MA (US)

(73) Assignees: The Trustees of Boston University, Boston, MA (US); Massachusetts Institute of Technology, Cambridge, MA (US)

( * ) Notice: Subject to any disclaimer, the term of this patent is extended or adjusted under 35 U.S.C. 154(b) by 380 days.

(21) Appl. No.: 16/598,468

(22) Filed: Oct. 10, 2019

(65) Prior Publication Data

US 2020/0116555 A1   Apr. 16, 2020

Related U.S. Application Data

(60) Provisional application No. 62/871,820, filed on Jul. 9, 2019, provisional application No. 62/744,826, filed on Oct. 12, 2018.

(51) Int. Cl.
*G01H 9/00*   (2006.01)
*G01S 13/86*   (2006.01)
(Continued)

(52) U.S. Cl.
CPC ............. *G01H 9/002* (2013.01); *G01S 13/86* (2013.01); *G01S 13/885* (2013.01); *G01V 1/003* (2013.01);
(Continued)

(58) Field of Classification Search
CPC ....... G01H 9/002; G01S 13/86; G01S 13/885; G01S 13/584; G01S 13/343; G01S 13/89;
(Continued)

(56) References Cited

U.S. PATENT DOCUMENTS 3,295,100 A * 12/1966 Armistead ............... G01V 1/44
367/27
4,843,597 A *  6/1989 Gjessing .................. G01H 9/00
367/87

(Continued)

FOREIGN PATENT DOCUMENTS

CN      102830401 A    12/2012
CN      107656272 A     2/2018
(Continued)

OTHER PUBLICATIONS

International Preliminary Report on Patentability in PCT/US2019/055593 dated Apr. 22, 2021.

(Continued)

*Primary Examiner* — Olumide Ajibade Akonai
(74) *Attorney, Agent, or Firm* — Schmeiser, Olsen & Watts LLP; Timothy P. Collins

(57) ABSTRACT

A system for near-surface subsurface imaging for detecting and characterizing subsurface heterogeneities comprises a non-contact acoustic source that senses a plurality of acoustic waves that travel through a surface; an instrument that outputs probing electromagnetic signals through the surface that interact and are affected by scattered signals of the acoustic waves and further senses vibrational modes of a subsurface below the surface; an imaging device that dynamically generates a time sequence of images of properties of the acoustic waves and maps elastic wave fields of the acoustic waves; and a processor that analyzes dynamic multi-wave data of the images to quantify spatial variations
(Continued)

in the mechanical and viscoelastic properties of the subsurface.

19 Claims, 10 Drawing Sheets

(51) Int. Cl.
    *G01S 13/88*     (2006.01)
    *G01V 11/00*     (2006.01)
    *G01V 1/00*     (2006.01)
    *G01V 3/12*     (2006.01)

(52) U.S. Cl.
    CPC ............... *G01V 3/12* (2013.01); *G01V 11/00* (2013.01); *G01V 2210/1299* (2013.01)

(58) Field of Classification Search
    CPC ............................ G01S 15/8977; G01V 1/02; G01V 2210/121; G01V 1/16; G01V 2210/1214; G01V 2210/1295; G01V 2210/1299; G01V 2210/622; G01V 2210/64; G01V 1/003; G01V 1/306; G01V 11/00; G01V 1/301; G01V 3/12; G01V 1/00; G01V 1/28; G01V 2003/084; G01V 2003/085; G01V 2003/086; G01V 3/38; G01V 1/34; G06T 7/20
    USPC ................................................. 342/52, 22
    See application file for complete search history.

(56) References Cited

U.S. PATENT DOCUMENTS

| | | | |
|---|---|---|---|
| H1524 H | 4/1996 | Thompson et al. | |
| 5,835,054 A | 11/1998 | Warhus et al. | |
| 5,920,285 A | 7/1999 | Benjamin | |
| 5,974,881 A | 11/1999 | Donskoy et al. | |
| 6,005,916 A | 12/1999 | Johnson et al. | |
| 6,134,966 A | 10/2000 | Donskoy et al. | |
| 6,415,666 B1* | 7/2002 | Donskoy ................ G01N 29/46 | 367/87 |
| 6,429,802 B1 | 8/2002 | Roberts | |
| 6,536,553 B1 | 3/2003 | Scanlon | |
| 6,667,709 B1 | 12/2003 | Hansen et al. | |
| 6,751,553 B2 | 6/2004 | Young et al. | |
| 6,809,991 B1* | 10/2004 | Pepper ..................... G01H 9/00 | 367/149 |
| 7,796,466 B2 | 9/2010 | Combee et al. | |
| 7,930,103 B2 | 4/2011 | Young et al. | |
| 8,086,426 B2 | 12/2011 | El Ouair et al. | |
| 8,089,390 B2 | 1/2012 | Jones et al. | |
| 3,120,991 A1 | 2/2012 | Koren et al. | |
| 8,228,066 B2 | 7/2012 | Ellingsrud et al. | |
| 8,366,619 B2 | 2/2013 | Kim et al. | |
| 3,478,533 A1 | 7/2013 | Thompson et al. | |
| 8,726,734 B1 | 5/2014 | Lin | |
| 8,797,828 B1* | 8/2014 | Lev .......................... G01V 8/00 | 356/497 |
| 8,849,523 B1* | 9/2014 | Chan .................... A01G 25/167 | 701/50 |
| 8,873,334 B2 | 10/2014 | Thompson et al. | |
| 8,941,816 B2 | 1/2015 | Grasmueck | |
| 9,086,501 B2 | 7/2015 | Beer et al. | |
| 9,291,733 B2 | 3/2016 | De Meersman | |
| 9,377,528 B2 | 6/2016 | Birken et al. | |
| 9,453,926 B2* | 9/2016 | Vu ........................... G01V 1/44 | |
| 9,500,077 B2 | 11/2016 | Li et al. | |
| 9,646,415 B2 | 5/2017 | Hanson et al. | |
| 9,651,707 B2 | 5/2017 | Tayart De Borms et al. | |
| 10,007,996 B2 | 6/2018 | Paglieroni et al. | |
| 10,378,316 B2 | 8/2019 | Thompson et al. | |
| 10,768,325 B2* | 9/2020 | Allegar ................ G01V 1/3817 | |
| 10,976,461 B2 | 4/2021 | Arumugam | |
| 2004/0225444 A1 | 11/2004 | Young et al. | |
| 2005/0062639 A1* | 3/2005 | Biggs ...................... G01S 13/89 | 342/194 |
| 2005/0128123 A1* | 6/2005 | Greneker, III ........ G01S 13/888 | 342/28 |
| 2006/0215175 A1* | 9/2006 | Yacoubian ........... G01N 21/9505 | 356/502 |
| 2007/0258325 A1 | 11/2007 | Grasmueck | |
| 2009/0292516 A1* | 11/2009 | Searles .................... E21B 43/00 | 702/11 |
| 2012/0035862 A1 | 2/2012 | Kollgaard et al. | |
| 2012/0195164 A1 | 8/2012 | De Meersman | |
| 2012/0253680 A1 | 10/2012 | Thompson et al. | |
| 2013/0083621 A1* | 4/2013 | Rikoski ................... G01S 15/89 | 367/7 |
| 2013/0338478 A1 | 12/2013 | Hirota et al. | |
| 2014/0104979 A1 | 4/2014 | Stolarczyk et al. | |
| 2014/0321240 A1 | 10/2014 | Barnes et al. | |
| 2015/0293213 A1 | 10/2015 | Felber | |
| 2016/0077055 A1* | 3/2016 | Corum ..................... G01S 13/02 | 73/627 |
| 2016/0109591 A1 | 4/2016 | Amin et al. | |
| 2016/0274235 A1 | 9/2016 | Martin et al. | |
| 2016/0320506 A1* | 11/2016 | Almuhaidib ........... G01V 1/364 | |
| 2016/0320509 A1 | 11/2016 | Almuhaidib | |
| 2017/0010388 A1* | 1/2017 | Haddad ............... G01S 13/9027 | |
| 2018/0031731 A1 | 2/2018 | Boulanger et al. | |
| 2019/0101659 A1 | 4/2019 | Ravasi | |
| 2019/0113647 A1 | 4/2019 | Arumugam | |
| 2020/0116555 A1 | 4/2020 | Brown et al. | |
| 2020/0116881 A1 | 4/2020 | Brown et al. | |
| 2021/0215842 A1 | 7/2021 | Liu et al. | |
| 2021/0278558 A1 | 9/2021 | Zhang et al. | |

FOREIGN PATENT DOCUMENTS

| | | | | |
|---|---|---|---|---|
| CN | 109742529 A | | 5/2019 | |
| CN | 111812726 A | | 10/2020 | |
| RU | 2681271 C1 * | | 3/2019 | |
| WO | WO-0233443 A2 * | | 4/2002 | ............... G01V 1/00 |
| WO | 2005085902 A1 | | 9/2005 | |
| WO | WO-2006099059 A2 * | | 9/2006 | ............. G01C 15/00 |
| WO | 2013057484 A2 | | 4/2013 | |
| WO | 2016079593 A1 | | 5/2016 | |
| WO | 2017160162 A1 | | 9/2017 | |
| WO | 2019079323 A1 | | 5/2019 | |
| WO | 2020077067 A1 | | 4/2020 | |
| WO | 2020077070 A1 | | 4/2020 | |
| WO | 2021245922 A1 | | 12/2021 | |

OTHER PUBLICATIONS

International Preliminary Report on Patentability in PCT/US2019/055599 dated Apr. 22, 2021.

International Search Report and Writtten Opinion in PCT/US2019/055593 dated Jan. 2, 2020; 10 pages.

International Search Report and Written Opinion in PCT/US2019/055599 dated Jan. 31, 2020; 13 pages.

Szabo, T.L. "Obtaining subsurface profiles from surface-acoustic-wave velocity dispersion," Journal of Applied Physics, No. 46, 1975.

Debeglia, et al. "Karts investigations using microgravity and MASW; Application to Orleans, France," Aug. 2006, Near Surface Geophysics, vol. 4, No. 4, pp. 215-225. http://www.earthdoc.org/publication/publicationdetails/?publication=8064.

Gabas, et al. "Combination of Geophysical Methods to Support Urban Geological Mapping," Jul. 2014, Surveys in Geophysics, vol. 35, Iss. 4, pp. 983-1002. https://doi.org/10.1007/s10712-013-9248-9.

Krawczyk, et al. "Shear-wave reflection seismics as a valuable tool for near-surface urban applications," Mar. 1, 2013, The Leading Edge, Vo. 32, No. 3, pp. 256-263. https://doi.org/10.1190/tle32030256.1.

Krawczyk, et al. "Sinkholes in the city of Hamburg—New urban sear-wave reflection seismic system enables high-resolution imag-

(56) References Cited

OTHER PUBLICATIONS ing of subrosion structures," Mar. 2012, Journal of Applied Geophysics, Vo. 78, pp. 133-143. https://doi.org/10.1016/j.jappgeo.2011.02.003.

Sloan, et al, "High-resolution ultra-shallow subsurface imaging by integrating near-surface seismic reflection and ground-penetrating dadar data in the depth domation," Jul. 2007, Journal of Applied Geophysics, vol. 62, Iss. 3, pp. 281-286. https://doi.org/10.1016/j.jappgeo.2007.01.001.

Fink, Mathias and Michael Tanter, "Multiwave imaging and super resolution," Feb. 2010, Physics Today, pp. 28-33.

Roth, Michael and Klaus Holliger, "The non-geometric PS wave in high-resolution seismic data: observations and modeling," 2000, Geophysical Journal International, vol. 140, pp. F5-F11.

Jeong, et al. "Principles and clinical application of ultrasound elastography for diffuse liver disease," Jul. 2014, Ultrasonography No. 33(3), pp. 149-160.

Leiv-J. Gelius, "INF-GEO 3310: Introduction to seismic processing and imaging," 2007, The University of Oslo, pp. 1-33.

Auld, B.A. "Acoustic Fields and Waves in Solids," 1990, Kreiger Publishing, Malabar, FL, second edition, vol. II, p. 88-93.

Non-Final Office Action in U.S. Appl. No. 16/598,442 dated Jun. 7, 2022.

Final Office Action in U.S. Appl. No. 16/598,442 dated Jan. 23, 2023.

Baker, et al., "Near-Surface Imaging Using Coincident Seismic and GPR Data", Feb. 2001, Geophysical Research Letters, vol. 28, No. 4, pp. 627-630, https://agupubs.onlinelibrary.wiley.com/doi/abs/10.1029/2000GL008538.

Liu, "Using GPR and Seismic Reflection Measurements to Characterize Buried Objects: Large-Scale Simulations", Aug. 1997, IGARSS '97, 1997 IEEE International Geoscience and Remote Sensing Symposium Proceedings. Remote Sensing—A Scientific Vision for Sustainable Development, vol. 3, pp. 1147-1149, DOI: 10.1109/IGARSS.1997.606379, https://ieeexplore.ieee.org/document/606379.

Nieto, et al., "Ultra High-Resolution Seismic and GPR Imaging of Permafrost. Devon Island, Nunavut", 2002, CREWES Research Report, vol. 14, pp. 1-22, 2002, https://www.semanticscholar.org/paper/Ultra-high-resolution-seismic-and-GPR-imaging-of-.-Nieto-Stewart/87b7b5b03a039fdd9c190b942b3809fbf6094086.

Powers, et al., "Integrated Use of Continuous Seismic-Reflection Profiling and Ground-Penetrating Radar Methods at John's Pond, Cape Cod, Massachusetts", 1999, Symposium on the Application of Geophysics to Engineering and Environmental Problems, Oakland, California, pp. 359-368, https://water.usgs.gov/ogw/bgas/publications/ SAGEEP99_041/index.html.

Non-Final Office Action in U.S. Appl. No. 16/598,442 dated Apr. 25, 2023.

Non-Final Office Action in U.S. Appl. No. 16/598,442 dated Aug. 18, 2023.

\* cited by examiner

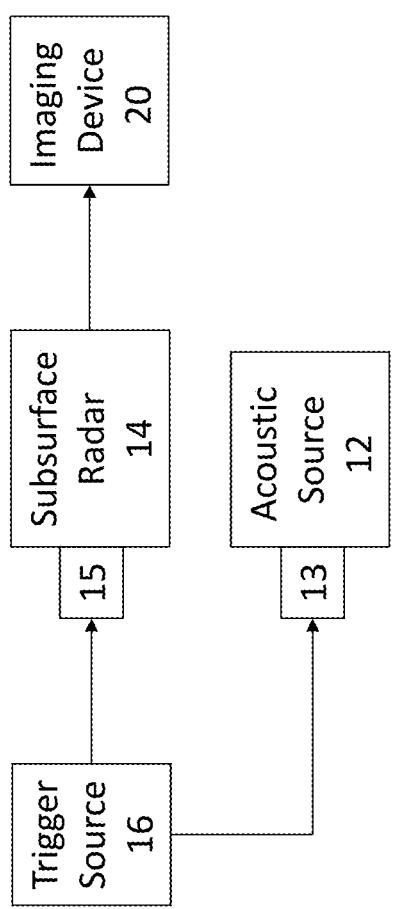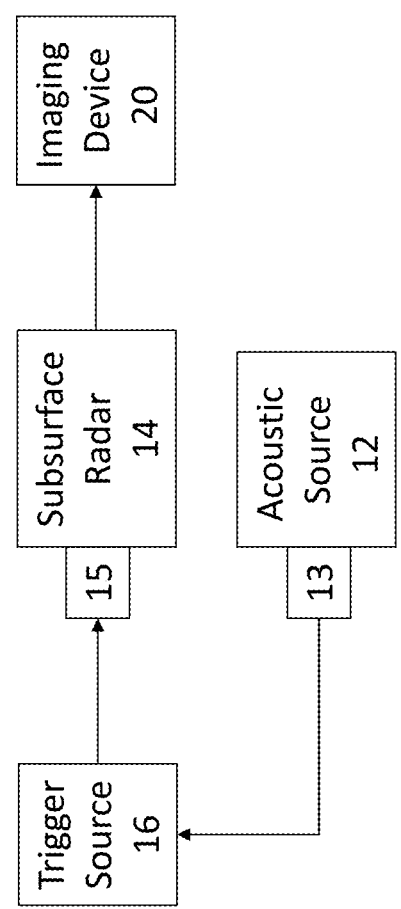

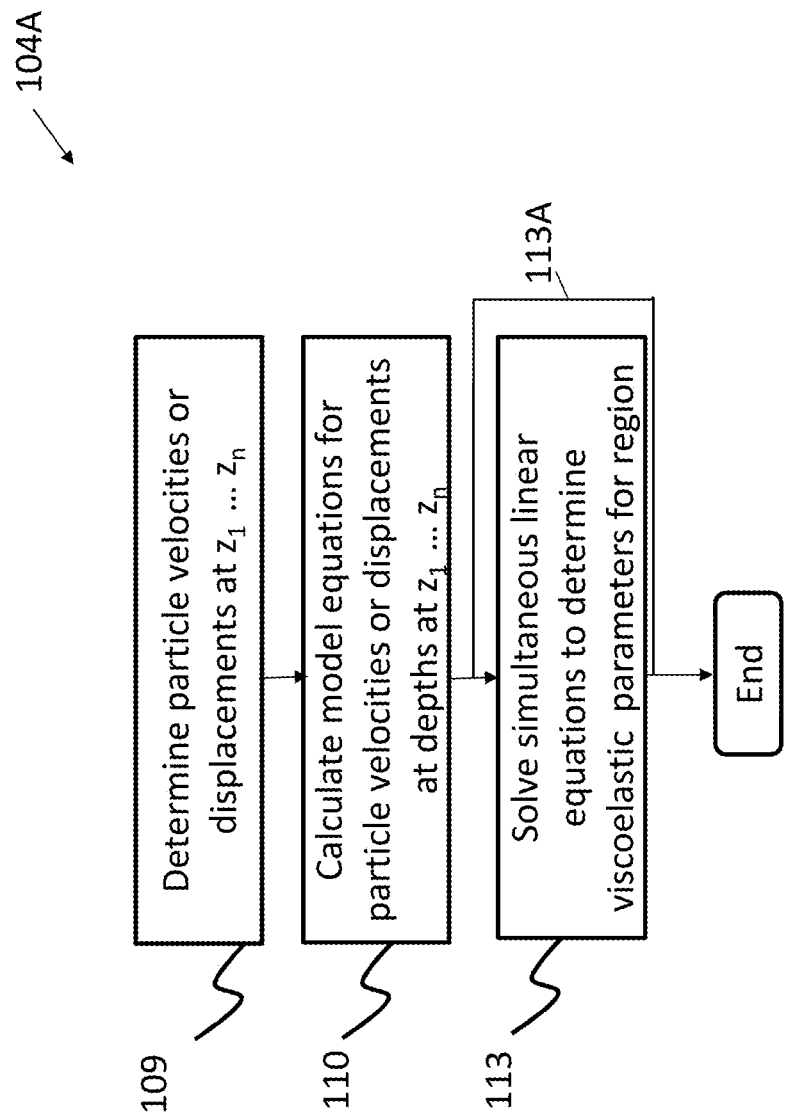

HETEROGENEOUS SUBSURFACE IMAGING SYSTEMS AND METHODS

CROSS REFERENCE TO RELATED APPLICATION

This invention claims priority to U.S. provisional patent application Ser. No. 62/744,826, filed Oct. 12, 2018, and entitled "Heterogeneous Subsurface Imaging Systems and Methods" and to U.S. provisional patent application Ser. No. 62/871,820, filed Jul. 9, 2019, and entitled "Heterogeneous Subsurface Imaging Systems and Methods" the contents of each of which is incorporated herein by reference in its entirely.

FIELD OF THE INVENTION

The present invention relates generally to near-surface imaging, and more specifically, to a system and method that combines multiple modalities to perform a subsurface imaging operation.

BACKGROUND OF THE INVENTION

Land surveyors, geologists, building contractors, and scientists alike have an interest in assessing the subsurface of a region of land of interest for varying reasons. Modern subsurface imaging techniques are performed to locate and map underground locations, and to reveal various subsurface failure zones at these locations such as natural karst, human-induced sinkholes, soil instability, or various other seismic and electromagnetic nonconformities. However, conventional seismic prospecting methods cannot adequately detect and interpret small, subtle heterogeneities such as tunnels or cavities, unknown or unmapped underground infrastructures, pipelines, and damage zones or failure zones in the soil or sediment substrate that can impact a surface infrastructure such as a building, or damage or failure zones occurring behind a casing inserted into a deep borehole in a drilling operation.

SUMMARY

Some embodiments of the present technology include a system for near-surface subsurface imaging for detecting and characterizing subsurface heterogeneities comprises a non-contact acoustic source that senses a plurality of acoustic waves that travel through a surface; an instrument that outputs probing electromagnetic signals through the surface that interact and are affected by scattered signals of the acoustic waves and further senses vibrational modes of a subsurface below the surface; an imaging device that dynamically generates a time sequence of images of properties of the acoustic waves and maps elastic wave fields of the acoustic waves; and a processor that analyzes dynamic multi-wave data of the images to quantify spatial variations in the mechanical and viscoelastic properties of the subsurface.

Other embodiments include a system for near-surface subsurface imaging for detecting and characterizing subsurface heterogeneities, comprising: a laser that senses a plurality of acoustic waves that travel through a surface; and a subsurface radar apparatus that senses vibrational modes of a subsurface below the perturbed surface by measuring scattered radar signals that interact with the surface acoustic waves at one or more depths below the perturbed surface.

Other embodiments include a method for determining a subsurface feature, comprising: transmitting at least one acoustic wave at a surface location; transmitting a synchronized radar signal that interacts with the at least one acoustic wave; sensing a plurality of perturbations in response to the output of the at least one acoustic wave at different depths in a subsurface at or near the surface location; determining a plurality of measurements of the at least one acoustic wave at the different depths; comparing data of the plurality of measurements to a computational elastic or viscoelastic acoustic propagation model for depths corresponding to the different depths of the at least one acoustic wave in the subsurface; and determining in response to the comparison a set of elastic or viscoelastic parameters for the surface location.

Other embodiments include a system that combines radar-based measured displacements with computational elastic or viscoelastic propagation models for describing displacements of a plurality of waves at different depths to infer or derive elastic and viscoelastic parameters of a subsurface in three dimensions.

Other embodiments include a method for determining a subsurface feature, comprising: transmitting a surface penetrating radar (SPR) signal at a surface; receiving a response signal that includes an elastic wave interaction with the SPR signal; rapidly processing the response signal; and determining a physical characteristic of the subsurface feature from the response signal.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon showing the principles of the invention.

FIG. 3 is a flow diagram illustrating a synchronization of a radar with an acoustic source using a controlled trigger source.

FIG. 4 is a flow diagram illustrating a synchronization of a radar by a detection of a propagating acoustic wave.

FIG. 11 is a flow diagram of a method for near-surface subsurface imaging performed by elements of the heterogeneous subsurface imaging system of FIG. 10.

DETAILED DESCRIPTION

Figure 1:
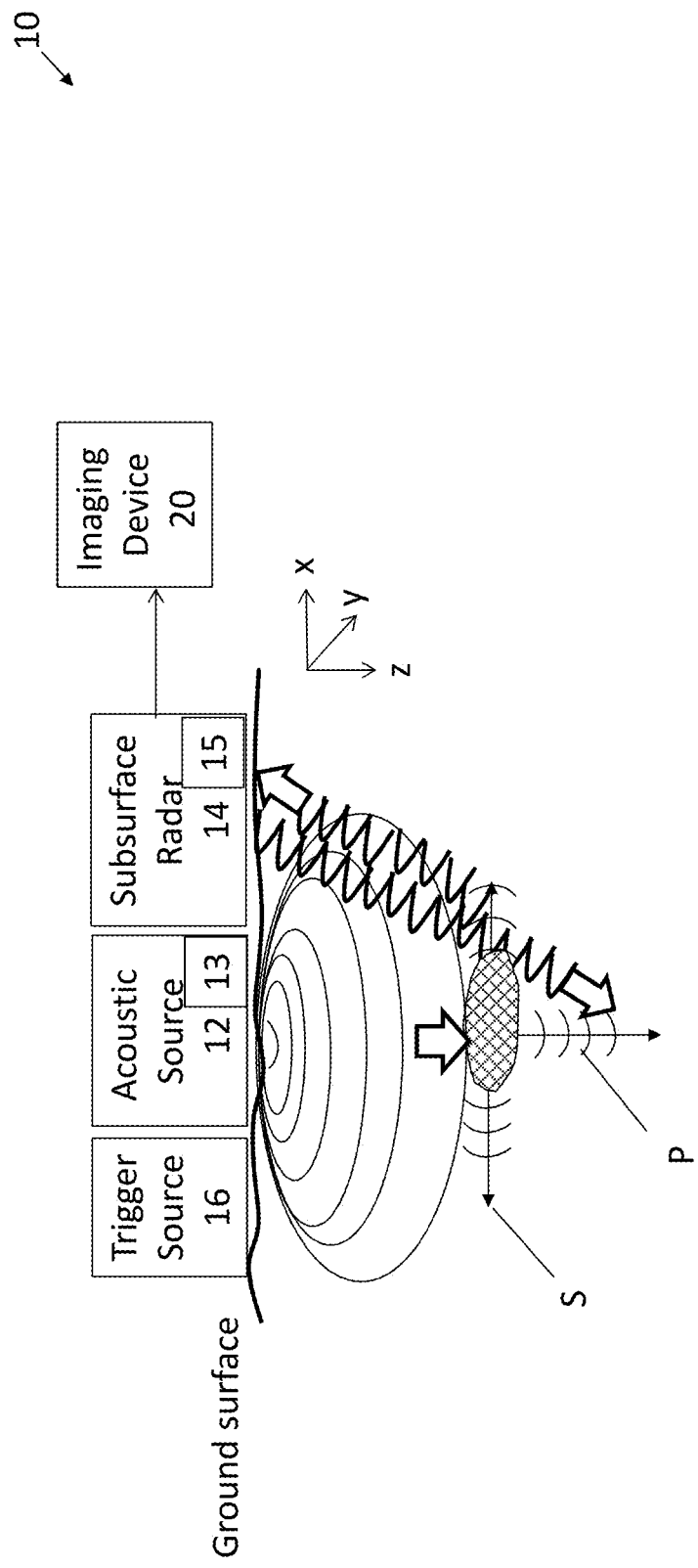
FIG. 1 is a view of a heterogeneous subsurface imaging system performing an operation, in accordance with embodiments of the present disclosure.

Reference is made in various embodiments described below to ground, a surface of the ground, a subsurface below the surface of the ground, or simply a surface other than a ground surface. It will be understood that the ground includes soil, road surface or pavement such as asphalt and concrete layers, gravel, sand and the like, and that the surface of the ground is the interface of the ground with the air, fluid, snow, rain, sludge, mud, or free space. The term subsurface as used below includes a depth below the surface. In some embodiments, the ground surface and/or subsurface comprises a surface characteristic such as, but not limited to snow, ice, water, mud, slush, sand, gravel, dirt, rock, debris and salt, steel borehole casing and cement, and so on. In other embodiments, the inventive concepts may equally apply to a surface and subsurface of a non-geological or structural application, such as a bridge, transportation system, and so on.

Reference is also made herein to surface penetrating radar (SPR). As used herein, SPR refers to any apparatus, system, and/or method that acquires data from the subsurface region through the surface of the ground and may also acquire data for the surface of the ground. The subsurface region may include boreholes or the like. In preferred embodiments, a SPR is constructed and arranged to detect selected displacement signals and display them versus time. Accordingly, the SPR preferably includes a special-purpose triggering device, for example, described herein.

In brief overview, embodiments of the present disclosure include systems and methods for imaging subsurface heterogeneities or related subsurface features, in which two different imaging modalities are combined synergistically, one of which includes an imaging modality. A targeted ground surface is perturbed with an acoustic source that produces a controlled seismic energy to insonify various subsurface features and that is synchronized with a subsurface penetrating radar apparatus operating as a virtual vibrometer so that a strobe-like sequence of underground vibrations can be produced and observed (or recorded) rapidly and sequentially over time for mapping elastic wave fields, e.g., compressional and/or shear waves. In particular, the SPR apparatus is constructed and arranged to apply a plurality of high frequency probing radar signals, which allows subsurface dielectric contrasts, reflectors, and scatterers vibrating along with the rocks and soils to act as passive markers responding to imposed acoustic vibrations. The detection of subsurface vibrations involves the ability to capture the shape, motion, and/or related characteristics of the scattered signals of the acoustic waves for imaging with high sensitivity. The mapping of compressional and/or shear wave fields in this manner can therefore permit the detection of underlying spatial and/or temporal variations in mechanical properties, for example, a mechanical modulus from shear wave speed, of a subsurface to be illuminated or otherwise detected and analyzed with sufficiently high detail to detect and characterize near-surface heterogeneities that are otherwise too subtle and difficult to image by either modality alone.

One such application may include, but is not limited to, the generation of imaging spatial variations performed to permit early warning to be achieved, for example, the detection of unsynchronized naturally occurring vibrations such as earthquakes. Another application may include the positioning of an acoustic source and radar unit of the system in or near a borehole, whereby changing conditions in the vicinity of boreholes or the like in the subsurface may be monitored to detect zones of possible failure or changing fluid conditions, such as a leakage of fluids near the boreholes. Embodiments of the systems and methods are not limited to the foregoing example applications.

The multi-wave imaging systems and methods in accordance with the embodiments distinguish from conventional geophysical imaging techniques that introduce joint inversion involving the independent processing of disparate geophysical imaging modalities, which are unlinked in both time and action in order to combine separately-acquired static images.

FIG. 1 is a cross-sectional view of a system 10 for imaging subsurface heterogeneities, in accordance with embodiments of the present disclosure. The system 10 may be referred to as a heterogeneous subsurface imaging system.

The system 10 includes an acoustic source 12, for example, an array of controlled acoustic sources or other mechanical vibrating source such as a seismic wave generator or related seismic source, that can produce seismic energy or related acoustic-related forces that includes acoustic or elastic signals, and provide for an imaging modality in which a ground surface is penetrated by the produced signals, resulting in a produced distortion, e.g., seismic waves. In some embodiments, the acoustic source 12 includes a system of vibrating sources deployed at or near the surface of the Earth or in a borehole or the like, which vibrate harmonically and continuously with phase shifts with respect to each other to focus an output for directing and inducing an acoustic wave at a predetermined depth. More specifically, the acoustic source 12 is constructed and arranged to insonify subsurface features, by focusing seismic energy while also varying frequency and signal levels.

In some embodiments, the acoustic source 12 may include an acoustic wave generator that generates a plurality of primary or compressional (P) waves, shear (S) waves, and/or related seismic or elastic acoustic waves at a focus region at the subsurface. The acoustic waves may be induced at various depths, frequencies, wavelengths, amplitudes, and velocities by executing a signal modulation technique, for example, related to an elastography imaging technique. Features of the acoustic source 12 are not limited by this example, and any vibration modulated to create a wave at an acoustic frequency or other frequency that is low as compared to a radar or other probing frequency wave or related disturbance may equally apply, as would naturally occurring vibrational sources such as an earthquake.

In some embodiments, the system 10 also outputs ground-penetrating radar waves or related low amplitude, high frequency signals to execute an imaging operation with respect to a dynamic wave field in response to the insonification produced by the seismic energy generated by the acoustic source. Rapid imaging is achieved because the radar signals operate at a higher frequency and a substantially higher velocity (typically one or several orders of magnitude greater) than the acoustic source. This is achieved by a subsurface radar apparatus 14 such as a SPR apparatus, or other ground penetrating radar (GPR) apparatus or probing sensor that provides high frequency probing signals, for example, electromagnetic waves in the microwave band of the radio spectrum into the earth subsurface of interest and receiving the reflected pulses as they encounter spatial and/or temporal variations. The subsurface radar apparatus 14 may provide one or more modalities for sensing the resulting subsurface vibrational modes, including but not limited to time-domain pulse-echo and/or various forms of frequency-modulated continuous wave (FMCW) protocols. Thus, in some embodiments of the systems and methods for imaging subsurface heterogeneities, two different imaging modalities are combined synergistically. In some embodiments, one of the imaging modalities relates to elastography. In other embodiments, other heterogeneous materials other than the sub-earth can also be imaged provided that the scale of some of the heterogeneities are smaller than the insonifying wavelength and the material is suitable for radar penetration. For example, biological matter such as organic tissue can be imaged by embodiments of a system and method described herein.

To achieve the foregoing, the acoustic source 12 is most often synchronized with the subsurface radar apparatus 14, which in some embodiments can occur by activating a trigger device 16, also referred to as a trigger source. Trigger device 16 can output a series of digital logic pulses which are in some embodiments received by a sensing unit 13 in acoustic source 12 initiating a series of acoustic waves to be transmitted into the subsurface. Trigger device 16 can be a digital clock or a pulse derived from a received external signal, for example, shown in FIG. 3. As also shown in FIG. 3, sensing unit 15 of the radar 14 and sensing unit 13 of acoustic source 12 each receives an output of the trigger device 16, which triggers an internal clock. Sensing units 13 and 15 can function as delay blocks and include time delays such as needed for the acoustic waves to propagate to certain subsurface regions of interest. In a different embodiment, shown in FIG. 4, the acoustic source 12 is itself a vibration such as an earthquake, or asynchronous source and the like that is sensed by a receiving processor, which automatically detects the propagating acoustic wave from the vibration source and initiates a pulse to excite the trigger source 16. In other words, in such embodiments, sensing unit 13 functions as a seismic receiver, while sensing unit 15 functions as a delay block.

The trigger device's output pulses are also received by a sensing unit 15 in the radar unit 14 initiating a series of electromagnetic waves to be transmitted into the subsurface. Sensing unit 15 can also include time delays such as needed for the acoustic waves to propagate to certain subsurface regions of interest. Radar unit 14 then receives the returning radar signals from the subsurface regions of interest. Sensing unit 15 can be used by the radar apparatus 14 to allow for the discrete sampling of the acoustic pulses. More specifically, the trigger device 16 is constructed and arranged to synchronize the sweeps to the proper point of the acoustic or seismic signal, and to achieve clear signal characterization. For example, triggering a radar output such that it monitors the peaks, troughs, zero crossings, or another particular phase characteristic of the acoustic vibration. To achieve this, in some embodiments, the trigger device 16 outputs a plurality of trigger signals that activate the subsurface penetrating radar's antenna(s) to transmit probing radar signals and/or sample a received waveform in response to an interaction with the compressional and shear waves produced by the acoustic source 12. For example, a start of an acoustic transmit sequence can be used. Also, this feature may allow for a stacking across particular phases to be achieved as described below.

For rapid sampling of the dielectric disturbances caused by an acoustic pulse, in some embodiments, either trigger device 16 can send a series of trigger pulses spaced at subintervals of an acoustic cycle or a triggering pulse can initiate a series of pulses internally generated in the radar apparatus 14 for rapid sampling of the acoustic signal cycles at sub-intervals of an acoustic cycle. In an asynchronous configuration, an acoustic wave such as an earthquake can be detected automatically by an external sensor by sensing features of the earthquake signal to initiate trigger device 16 to accomplish acoustic and radar signal synchronization. In addition, a stacking operation may be permitted, for example, described herein.

The subsurface radar apparatus 14 may be constructed and arranged to perform one or more sweeps to obtain the data for interacting with the generated acoustic waves so that an imaging device 20 can perform an imaging operation with respect to determining subsurface characteristics. In some embodiments, the subsurface radar apparatus 14 is configured for a pulse-echo, or other mode, and the seismic vibrations are used as a source of disturbance of the dielectric scatterers, which permits the subsurface radar apparatus 14 to detect the seismic wave motion via its output which interacts with the seismic scattering for high frame rate imaging performed by the imaging device 20. The subsurface radar apparatus can operate as a virtual vibrometer due at least in part to the high speed of acquisition offered by the subsurface radar 14, which can remove the sound speed limitation in the Earth, and not only for monitoring shear wave motion but also compressional wave motion.

The imaging device 20 measures characteristics of a response or return signals reflected from the subsurface, and performs high frame rate imaging from the response signals including, at least in part, a reflection of the SPR signal from a subsurface by dynamically generating a time sequence of high resolution images of properties of the mapped acoustic waves. In some embodiments, the imaging device 20 is part of the SPR apparatus 14, for example, including a receive antenna, which in turn communicates with the imaging device 20 that receives data from a network interface or other I/O device of the SPR apparatus 14 regarding the return signals. In some embodiments, the SPR transmit antenna and signal receiver may be the same, or may be different styles of elements, or be positioned in different locations. In other embodiments as shown in FIG. 1, the imaging device 20 is standalone or physically separate from but in electronic communication with the SPR apparatus 14 to perform an imaging operation. For example, the imaging device 20 may include but not be limited to sensors, transducers, scanning devices, or the like to generate high-resolution imaging results from the return signals. For example, to provide spatial scanning for the imaging device 20, the receiver may be moved, for example, rolled along the ground at a predetermined rate to provide spatial scanning for imaging. Furthermore, the acoustic sources can be separated from the radar apparatus 14 or physically combined. A signal receiver of the SPR apparatus 14 and/or the imaging device 20 may include a special purpose computer processor that measures a feature, for example, intensity, phase, frequency, and so on, of the response signals received from the SPR antenna, sensor, or other receiving device. In some embodiments, the received signal may be adapted, filtered, and/or sampled so as to preserve the signal for generating the images. The imaging device 20 can therefore perform a dynamic multi-wave imaging operation that provides for detecting small-scale spatially and/or temporally varying signatures. In some embodiments, the imaging device 20 can perform an iterative updating and interplay between source and receiver data to improve image definition by focusing the radar probing transmit signals with high clarity.

During operation of the system 10, the elastic waves produced by the acoustic wave generator 15 are imaged in real-time or near real-time applying a combination of imaging techniques. The application of signals output from the SPR apparatus 14 results in high spatial resolution and an extremely fast response time as compared to the speed of the propagating elastic waves, which enables the imaging of the elastic waves. For example, induced low frequency continuous elastic waves propagate away from the focus region, and are measured so that at various phases of the low frequency modulation, pulsed back-scattered signals are received and used to create the time sequence of images formed by the electromagnetic waves of the SPR 14. The positions of the scatterers can be used in the processing when comparing successive images in time to delineate the amplitude and phase of the elastic waves as they move away from the source. In some embodiments, for any radar wave imaging modality, the system and method monitors phase and amplitude changes away from the source by recording the positions of scattering objects and/or speckle positions. These parameters may be compared at nearby points in space used to determine the local acoustic wave velocity, viscoelastic losses, and/or related parameters with respect to the medium. Accordingly, scanning these measurements over predetermined areas of the medium allows an image of elastic properties or the like to be generated. Improved sensitivity may be obtained by imaging the viscoelastic properties of the subsurface soil because the parameters incorporate both elasticity and absorption. Analysis for motion can be performed by the imaging device 20 taking a sequence of images over time, looking in the spectral window centered about the acoustic wave source frequency, and resolving spatially averaged or filtered changes of Fourier intensity or phase changes for the collective motion of a spatial zone or cluster of scatterers changing in time. In some embodiments, the imaging device 20 includes a special purpose processor or otherwise communicates with a separate computer that analyzes dynamic multi-wave data of the images to quantify spatial variations in the viscoelastic properties of the subsurface.

Figure 2:
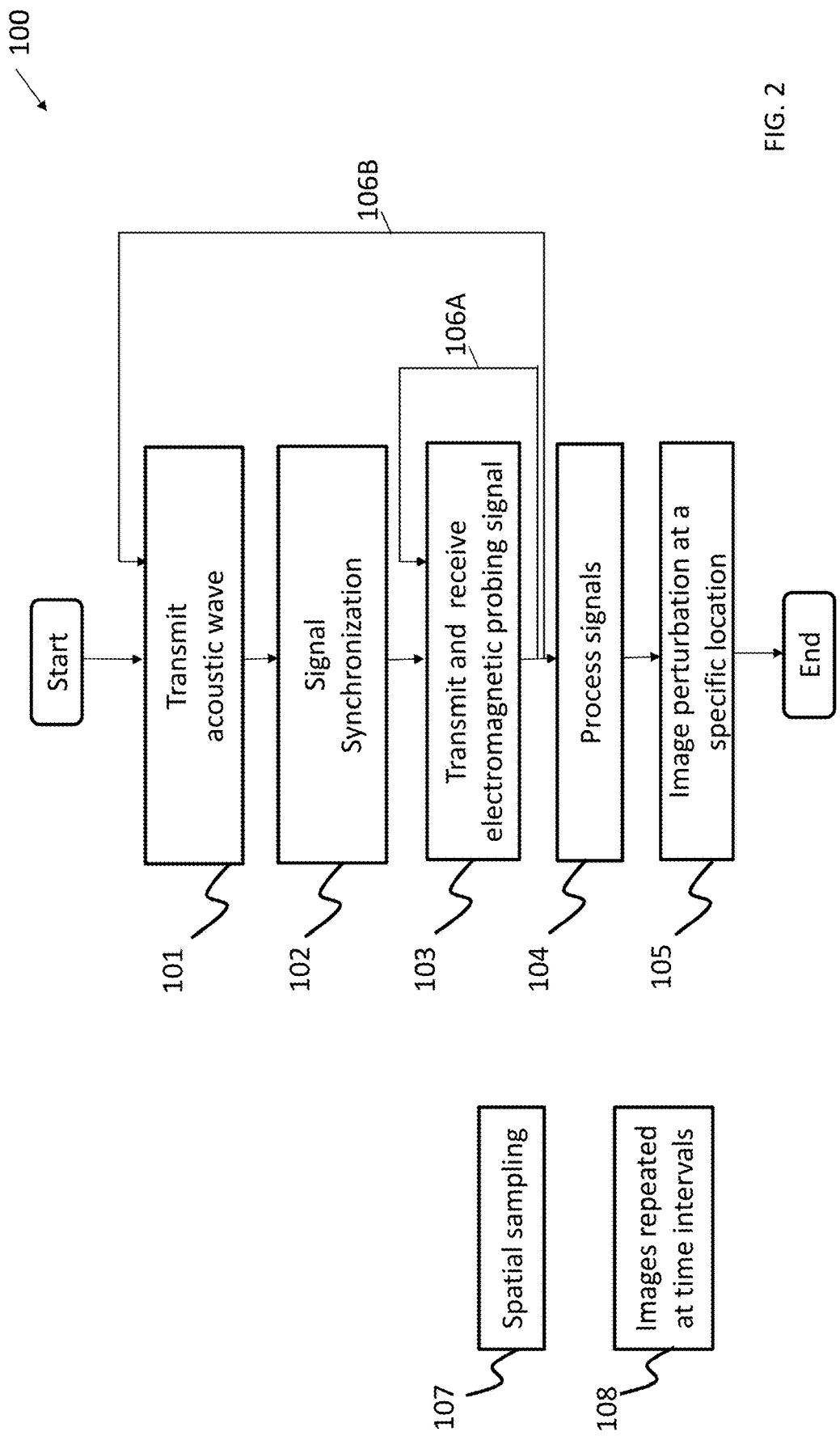
FIG. 2 is a flow diagram of a method for near-surface subsurface imaging, in accordance with embodiments of the present disclosure.

FIG. 2 is a flow diagram of a method 100 for near-surface subsurface imaging, in accordance with embodiments of the present disclosure. Some or all of the method 100 can be performed by elements of the heterogeneous subsurface imaging system 10 of FIG. 1.

At block 101, an acoustic wave is transmitted at a ground surface, for example, resulting in the generation of P waves and/or S waves at a subsurface.

At block 102, the subsurface radar is synchronized to the trigger source and a synchronized radar sampling is applied to the acoustic wave at a rate faster than the propagation speed of the waves. In some embodiments, the subsurface radar apparatus 14 includes a synchronization and sequential processing module 15 that performs this step. The synchronization and sequential processing module 15 may be provided for permitting a triggering operation to be performed, for example, as described herein. In some embodiments, a trigger device 16 is activated as part of the synchronization step.

At block 103, a high frequency probing signal is output from the subsurface radar apparatus 14 that interacts with the acoustic wave, for example, a shear wave, to allow a selective sensing of resonances to be produced to increase the signal-to-noise ratio. For example, the subsurface radar apparatus 14 may include focused transmit/receive sensors that can specifically target the response of particular subsurface features, and increase signal-to-noise while improving imaging resolution.

After computation of scanned lines derived from the interaction of the probing signal and acoustic wave, at block 104, the displacements versus time are extracted by producing and comparing sequential, spatial, and temporal variations in signals. Further processing is accomplished depending on the type of imaging selected. For example in one embodiment, temporally sequential displacements are compared or correlated to produce an elastography image.

Loops 106A, B (generally, 106) refer to a stacking operation that can be performed between foregoing steps of the flow diagram in FIG. 2, depending on various embodiments. In one embodiment, rapid acquisition of radar signals can be averaged so quickly that the acoustic wave appears stationary. In another embodiment, a processed acoustic signal is repeatedly sampled at the same spatial location through synchronous phasing and averaging. Stacking steps can be performed after step 101 or 103 depending on a stack at one spatial location or a stack at one acoustic vibration phase. As shown in loop 106A, a stacking operation relates to one acoustic vibration stage, and a sample average can be determined. As shown in loop 106B, a stacking operation is performed at a spatial location. In some embodiments, each stacking operation illustrated according to loop 106B may include multiple sample averages determined from loop 106A.

Figure 9:
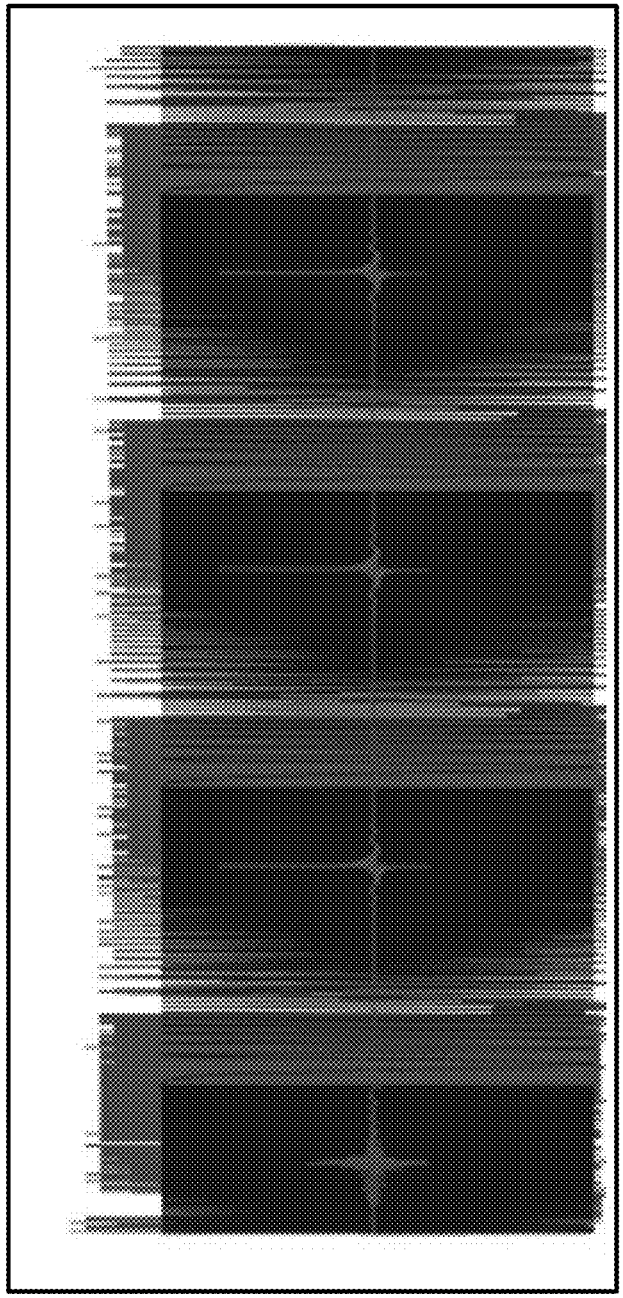

In some embodiments, illustrated by way of example in FIG. 9, the rapid sampling and matched filter signals for multiple interrogations of an acoustic pulse as needed for stacking are plotted. Here, a vibration signal frequency and amplitude can be monitored over time by a repeated rapid firing of a sequence of FMCW chirp signals. Shown are the transmitted (blue) and received (red) chirps and the corresponding successive matched-filter pulses (green) used in this analysis.

In block 107, a line or other unit of derived mechanical properties is converted to data and stored, for example, in a data storage device. In some embodiments, one pixel per spatial location is generated. At the end of the sequence depicted in FIG. 2, for example, after block 105, the receiving device 14 can move to a different location so that additional scanning operations can be performed. Alternatively, method 100 at blocks 101-104 is repeated as needed at later times to detect changes in mechanical properties of a subsurface region. Here, comparisons may be performed.

After the completion of all the parts of the image, for example, corresponding to image pixels or lines corresponding to spatial locations, at block 105, mechanical properties of the subsurface are computed and displayed by the imaging device 20; then the sequence of blocks 101-105 is repeated.

In block 108, after an imaging frame is finished, the process for filling in a new frame is initiated at a selected time interval such that the changes in subsurface properties can be monitored over time.

A feature of method 100 is that the system can perform an imaging operation, for example, similar to elastography, despite the low compressional wave to shear wave velocity ratio, e.g., the ratio of P wave to S wave velocities is less than 10. In shear wave elastography used in medical ultrasound applications in which there is a substantially greater difference between compressional and shear waves traveling through the human body, e.g., a ratio of P to S velocities between 50 and 150, which enables an S wave to be tracked with a P wave.

An operation using the system described herein may be performed with respect to seismic energy, even though the ratio of P wave to S wave velocities may be significantly low, i.e., on the order of 2-10, due to the state of the ground surface, i.e. comprising solid rocks, soils, sediments, and so on, which prevents the effectiveness of imaging when tracking shear wave motion with a pulsed P-wave. For example, the acoustic properties for dry sand may include a P wave velocity of 400-1200 m/s and an S wave velocity of 100-500 m/s. Accordingly, a hybrid imaging method in accordance with some embodiments includes the use of a high frequency SPR instrument 14, which provides a velocity of $10^8$ m/s at a frequency ranging from 10-400 MHz, providing penetration depths of 20-60 m and a wavelength of 1 m depending on the dielectric constant of the soil sediment. From this data, a set of time sequence of images can be produced. For example, at a 10 m depth, the system may instantaneously and repeatedly observe a 10 m long shear wave displacement field averaged over small volumes, or sub volumes, of the target subsurface as determined by the horizontal and vertical SPR resolution, e.g., a Fresnel zone size of 1 m for a 10 m depth. A time sequence of images may reveal the shear wave speeds, the viscoelastic properties, and local resonances. In some embodiments, the high velocity of radar waves permits an application of the system and method with respect to the imaging of propagating P waves in the Earth. In some embodiments, the ratio of radar velocity to acoustic wave velocity is many orders of magnitude.

As previously described, the detection of subsurface vibrations involves the ability to capture the shape and motion of the scattered signals of the acoustic waves for imaging with high sensitivity. To achieve this, the system 10 illustrated in FIG. 1 generates a plurality of radar traces from a processed dataset generated from the measured return signals. Each trace can identify the location of various reflectors or related back-scattered signals at various depths along the z axis. Successive trace data can be collected and recorded at different points in a spatial sequence along a ground surface.

Figure 5:
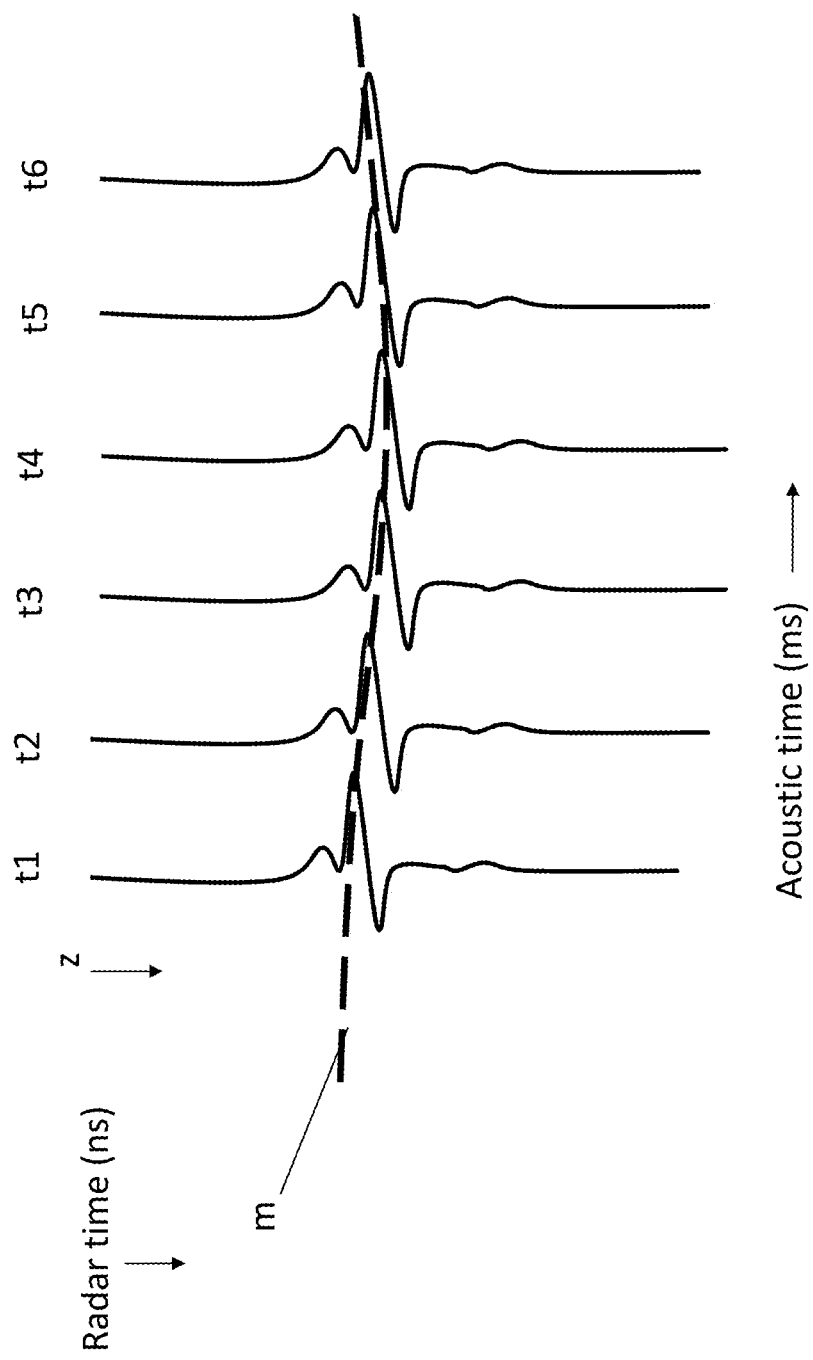
FIG. 5 is a graphical view illustrating the recording of characteristics of subsurface vibrations, in accordance with embodiments of the present disclosure.

FIG. 5 illustrates the tracking of the motion of a single scatterer over time. As shown in FIG. 5, the system 10 can produce one or more traces, e.g., illustrated as radar pulses, at a particular point, e.g., at a predetermined location, and generate a plurality of images corresponding to the identified point over time, e.g., traces t1-t6 (measured in milliseconds), at a predetermined frame rate. Each trace t1-t6 can correspond to an average of a predetermined number of radar pulses reflected from the single scatterer over successive times. In particular, the traces t1-t6 are received radar signals received at different times from the same subsurface location of the system, which senses the acoustic wave (m) propagating past the subsurface location. For example, as shown, each dash in the wave (m) shown in FIG. 5 corresponds to the same scatterer observed at different times. The shape and motion of a seismic p or s-wave (m) can therefore be captured. This time sequence of images may reveal shear wave speeds, viscoelastic properties, local resonances, and so on, when the trigger device 16 is activated.

Figure 6:
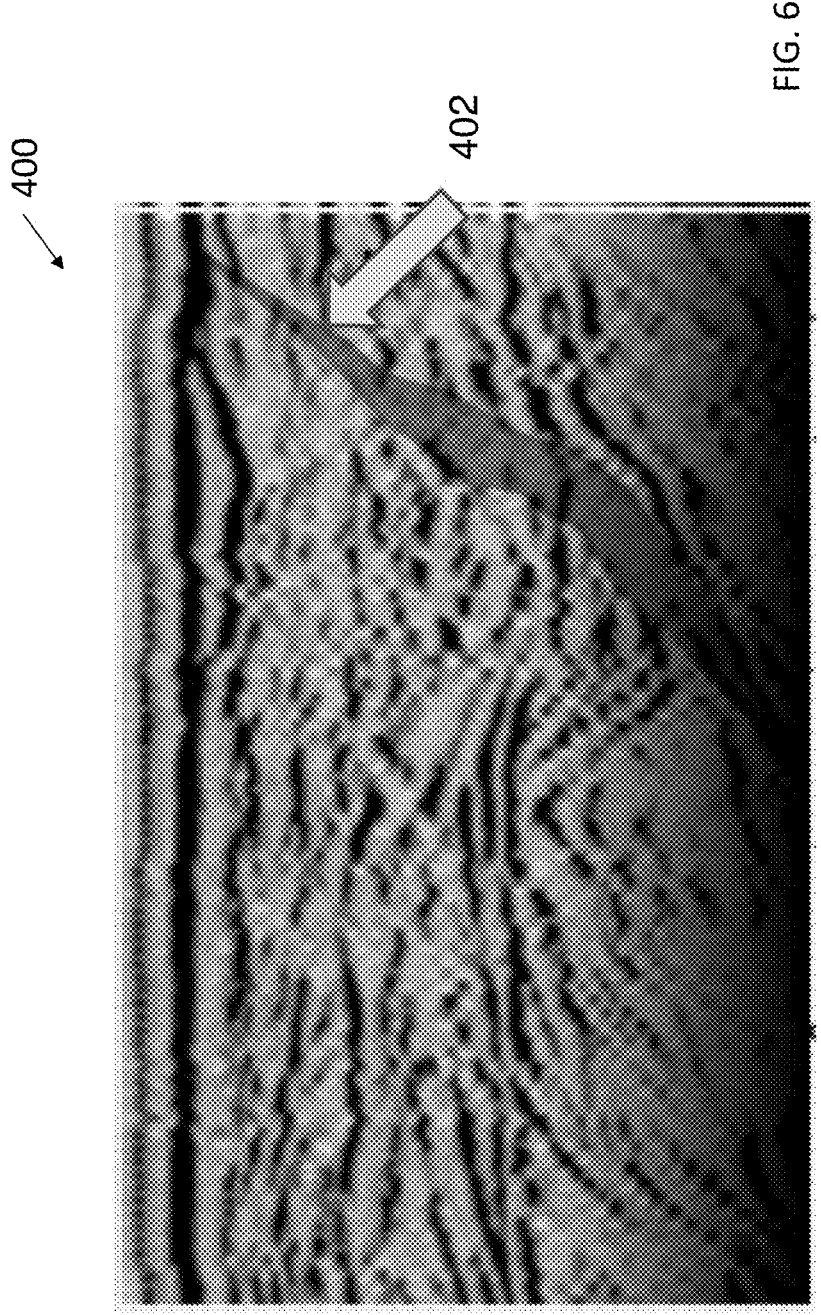
FIG. 6 is a graphical view illustrating displayed variations in mechanical and viscoelastic properties determined from an imaging technique performed at a subsurface heterogeneity, in accordance with embodiments of the present disclosure.

As shown in FIG. 6, areas of interest in an image 400 produced by the system may be identified. Referring in particular to FIG. 6, a static GPR image is overlaid by a shaded region 402 indicating a reduced elastic modulus inferred by time shifts of a plurality of radar pulses as they interact with acoustic waves. In other examples, interpreted spatial variations in viscoelastic properties of the Earth surface or other shapes induced by the acoustic wave may be highlighted, for example, according to a color-code scheme. Here, subtle differences in amplitude in the shaded region of the image may assist in the detection and characterization of subsurface heterogeneities with increased signal-to-noise and improved imaging resolution. In other examples, data regarding differences in time of flight (TOF) measurements of the radar signal with and without an acoustic source insonifying a selected subsurface region can be used to derive velocity and elastic modulus images.

Figure 7:
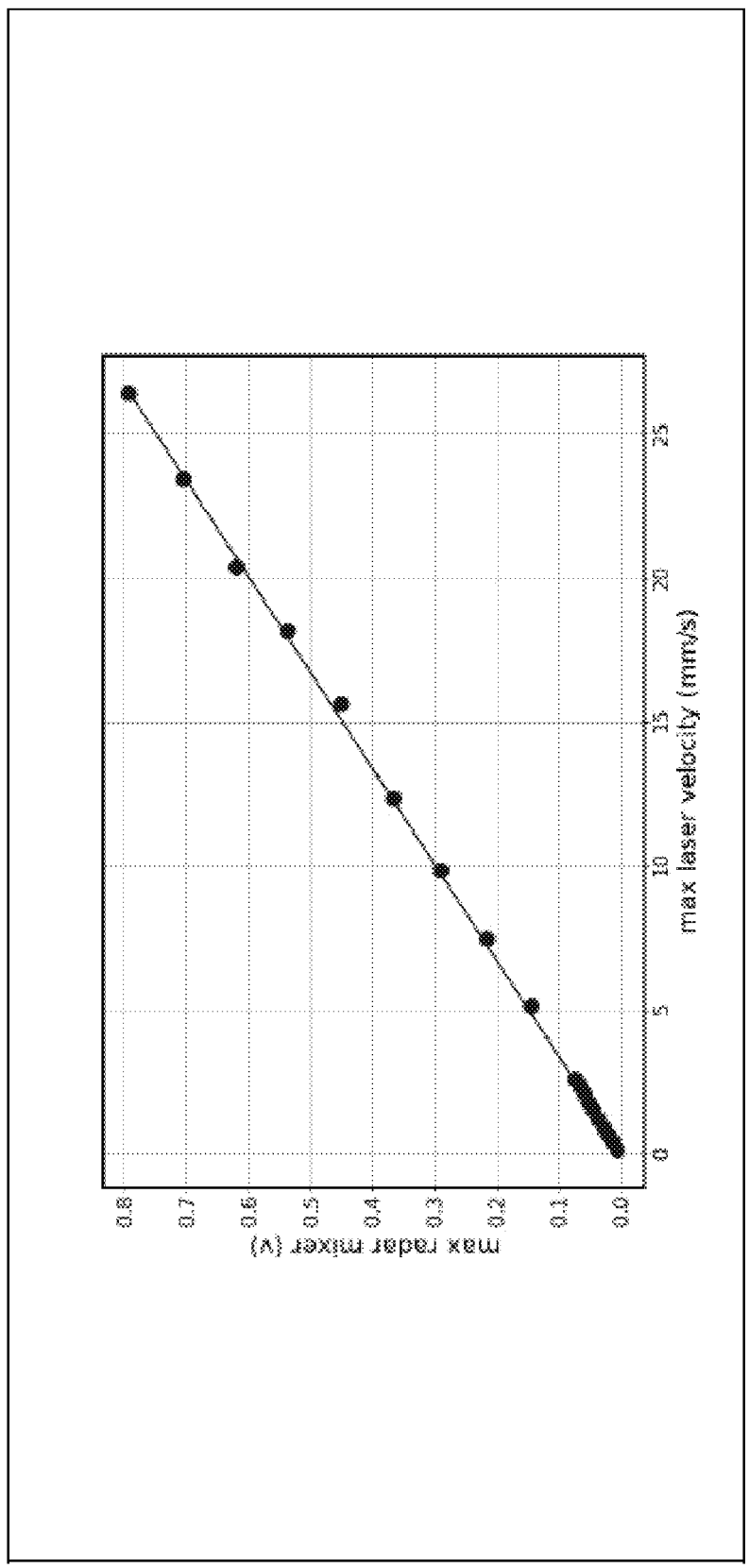
FIGS. 7-9 are graphical views illustrating various features of a heterogeneous subsurface imaging system and method, in accordance with embodiments of the present disclosure.

As previously described, a feature of the systems and methods of the inventive concept is the increased resolution and sensitivity over that of individual conventional seismic and subsurface imaging techniques. Accordingly, resolution can be approximately on the order of a wavelength in focused imaging applications. For example, an acoustic source operating at 100 Hz may produce a wavelength that is approximately 3.3 m in air and 33 m in the earth. At 2.4 GHz, a radar apparatus may produce a wavelength of 12.5 cm in air and 6 cm in earth. In this inventive method, displacement changes on the order of a micron can be detected at these example frequencies. Referring by way of example to FIG. 7, an improvement in resolution of at least four orders of magnitude may be achieved, in particular, as shown by the linear behavior over a range of vibration amplitudes.

Figure 8:
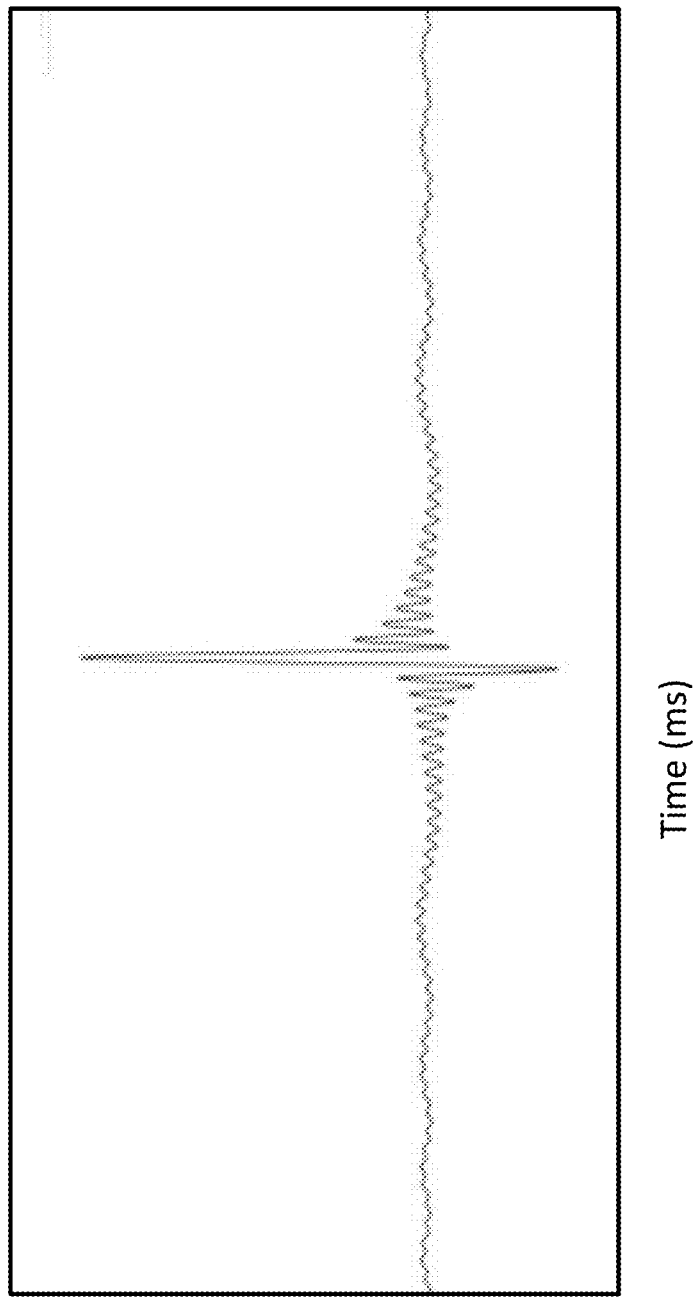

Another example relates to the processing by the subsurface radar apparatus 14 of FMCW chirp signals, in which the range to a target, the vibration amplitude (acoustic field displacement), and vibration frequency can be measured. Referring to FIG. 8, as an example of signal processing, a matched filter for a single acoustic pulse is shown. More specifically, a matched-filter pulse is derived by convolving transmitted and received FMCW chirp signals.

Figure 10:
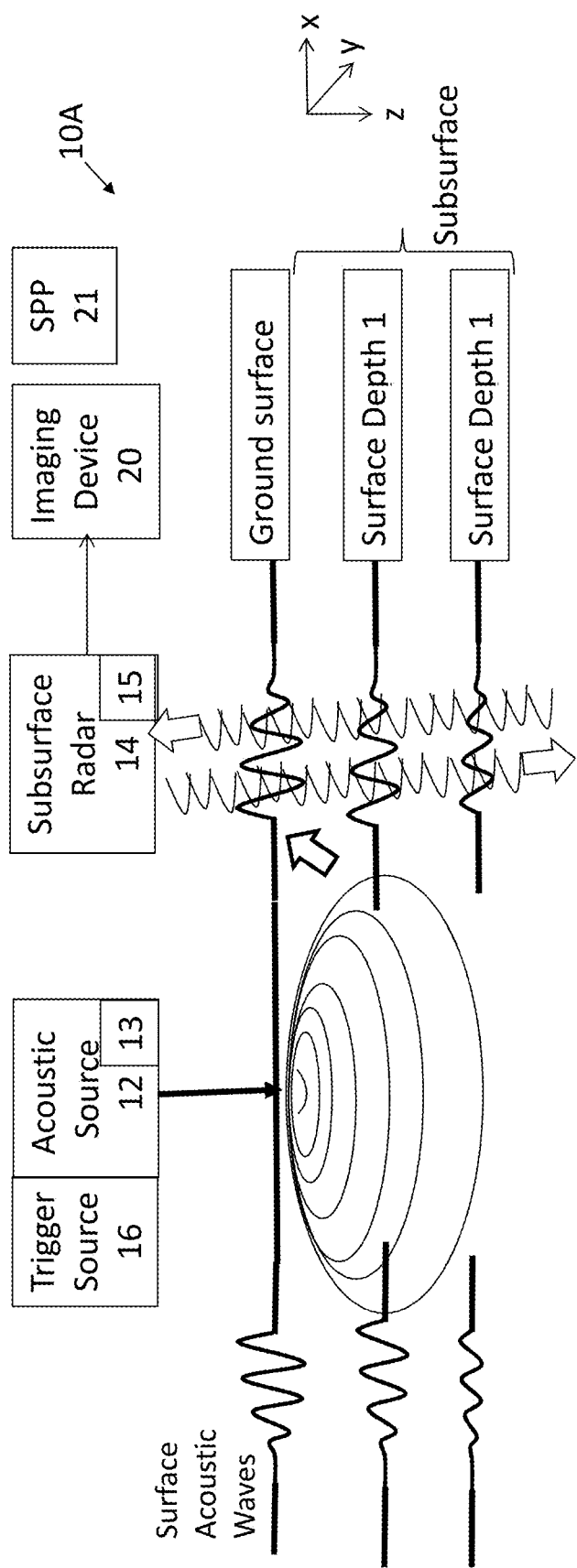
FIG. 10 is a view of a heterogeneous subsurface imaging system performing an operation, in accordance with other embodiments of the present disclosure.

FIG. 10 is a view of a heterogeneous subsurface imaging system 10A performing an operation, in accordance with other embodiments. Some elements of the system 10A are similar to or the same as those of the system 10 described with reference to FIGS. 1-9. Details thereof are therefore not repeated due to brevity.

As described above with respect to FIG. 1, some embodiments of a system include an acoustic source 12 that is in contact with a ground surface when producing a vibration or acoustic-related force. FIG. 10, on the other hand, illustrates an embodiment in which a system 10A has an acoustic source 12 that proximal to, but not required to be in direct contact with the surface. Here, the non-contact acoustic source 12 can be a laser or the like that produces waves that are directed at the ground from a location above the ground surface, and that penetrate the surface to travel through some or all of a subsurface below the ground surface. Pulsed lasers, can synchronize with a GPR apparatus excite acoustic waves thermoelastically. In some embodiments, the acoustic source 12 includes a Q-type switched laser apparatus. In addition to S and P waves, the non-contact acoustic source 12 can generate propagating waves via a thermoelastic effect on the surface and/or subsurface. For example, laser energy can be output from the acoustic source 12 to generate waves of well-known frequencies in the surface and/or subsurface, also referred to as surface waves or acoustic surface waves. The system 10A can control the partitioning of energy into different wave types by the spot size, pulse length, energy and triggering of the acoustic source 12.

The acoustic source 12 can generate one or more subsurface acoustic modes in addition to a surface acoustic wave such as Rayleigh waves or the like. Examples of such waves may include but not be limited to compressional and shear waves, Love waves, and so on. Also shown in FIG. 10 are surface waves and the subsurface displacements of propagating surface wave. The example displacements are shown in FIG. 10 at the ground surface (depth 0), as well as surface depths 1 and 2, but not limited thereto. Perturbations resulting from the output of the acoustic source 12 are measured at the different depths in the subsurface, i.e., depths 0, 1, and 2, by the scattered radar signals generated, for example, by the subsurface radar apparatus 14. These reflections from moving subsurface heterogeneities constitute a depth profile normally occurring in an interrogating radar time line consisting of a radar transmission and subsequent return as shown in FIG. 10. The distribution of displacements corresponds to surface and subsurface movements associated with the compressional and shear energy of the propagating acoustic surface wave. Typically vertical subsurface surface acoustic wave displacements penetrate approximately one surface acoustic wavelength into the subsurface and vertical displacements are associated with shear forces.

FIG. 11 is a flow diagram of a method 104A for near-surface subsurface imaging performed by elements of the heterogeneous subsurface imaging system of FIG. 10. In some embodiments, some or all of the method 104A can be performed as steps of the signal processing step 104 described with reference to FIG. 2. In some embodiments, some or all of the steps of method 104A are performed by the system 10A described with reference to FIG. 10. For example, referring to FIG. 11, features may be performed by a special purpose processor 21 shown in FIG. 10.

As previously described, perturbations are measured at different depths in the subsurface by the scattered radar signals generated, for example, by a ground penetrating radar. The distribution of displacements corresponds to movements associated with the compressional and shear energy of the propagating acoustic surface wave. The resulting radar-based measured displacements can be combined with computational viscoelastic propagation models for describing the displacements of the surface acoustic wave with depth to infer or derive elastic and viscoelastic parameters of the subsurface in three dimensions. Corrections for physical effects such as diffraction, absorption, dispersion, source geometry, temperature, etc. can also be made.

The foregoing describes example for the measurement and processing of data regarding a surface wave. However, an approach using a model to derive fundamental physical parameters can also apply in general to other types of wave propagation.

As previously described, method 104A may be performed as part of step 104 of FIG. 3. In some embodiments, some or all steps of method 104A may be performed after step 105 of FIG. 2. During the imaging or determination of perturbations at a specific location, a sequence of these measurements is carried out at a number of depths $z_0 \ldots z_n$ as shown in step 109, thereby creating a displacement profile with depth. This feature of the method 104A may be of interest, for example, with respect to Rayleigh waves having an amplitude that decreases with depth and depends on elasticity characteristics of the subsurface and so on.

At step 110, this data can be compared to a viscoelastic acoustic propagation model predictions for the same depths for the wave type, e.g., a surface acoustic wave. A similar approach can be applied to other types of visoelastic and elastic wave types.

The predictions and data are compared, for example iteratively, through a set of simultaneous linear equations for several depths in a least squares minimization sense as indicated by block 113 and loop 113A. These operations result in the extraction of viscoelastic constants for a region of interest.

With regard to the calculation of model equations described in step 110, exemplary model equations are as follows, but not limited thereto:

Surface acoustic wave displacements may extend about a wavelength below a surface. As shown in B. A. Auld, *Acoustic Fields and Waves in Solids* (Kreiger Publishing, Malabar, FL, second edition 1990), Vol. II, p. 88-93 and T. Szabo, *Obtaining Subsurface Profiles from Surface Acoustic Wave velocity Dispersion* (J. Appl. Phys. 46, 1448 (1975); the content of each of which is incorporated by reference in their entirety, for a surface acoustic wave (SAW), model equations for displacements with attenuation decay constants $\alpha_1$ and $\alpha_2$ and $\lambda=\omega/V_R/f$ where f is frequency can be solved. For a SAW traveling to the right along the positive x axis and decaying into the subsurface along a direction z, equations for the displacements along the x and z directions can be written as the following (Szabo, 1975):

$$U_1(z) = A_{11} \exp(-\alpha_1 z/\lambda) + A_{12}\exp(-\alpha_2 z/\lambda), \quad (1)$$

$$U_3(z) = A_{31} \exp(-\alpha_1 z/\lambda) + A_{32} \exp(-\alpha_2 z/\lambda), \quad (2)$$

By taking the natural logarithm of each equation, algebraic equations are obtained which can be solved for the unknowns $A_{ij}$ and $\alpha_1$ and $\alpha_2$ and $\lambda$:

$$\ln(U_1(z)) = \ln(A_{11}) - \alpha_1 z/\lambda + \ln(A_{12}) - \alpha_2 z/\lambda \quad (3)$$

$$\ln(U_3(z)) = \ln(A_{31}) - \alpha_1 z/\lambda + \ln(A_{32}) - \alpha_2 z/\lambda \quad (4)$$

For a radar beam directed vertically downward, from methods described herein, the acoustic displacement or equivalently, the particle velocity (the time derivative of the displacement) is found as a function of depth from, for example, the movement of speckle or subresolution particles. A displacement data set of depths (z1, z2 ... zn) found from usually one depth profile time series is equated to a set of model equations such as Equations 1 or 3 for each depth. The model equations for a set of depths are solved simultaneously for the unknowns. The unknowns can be related from the characteristic equations in Auld, 1990 incorporated by reference above, to sound speeds $V_R$, $V_s$ and $V_1$ and their corresponding elastic constants. For an obliquely directed radar beam, both Equations 3 and 4 are required.

While the invention has been shown and described with reference to specific embodiments, it should be understood by those skilled in the art that various changes in form and detail may be made therein without departing from the scope of the invention.

What is claimed is:

1. A system for near-surface subsurface imaging for detecting and characterizing subsurface heterogeneities, comprising:
   a non-contact acoustic source that excites a plurality of propagating acoustic waves that travel through a surface at a plurality of different depths of a subsurface and at different frequencies and produces a scattered wave field in response to an insonification of subsurface features;
   a radar instrument that outputs propagating electromagnetic signals through the surface that interact with and are affected by the scattered wave field of the acoustic waves and further provides one or more modalities that sense a plurality of different vibrational modes at the plurality of different depths of the subsurface;

an imaging device that communicates with the radar instrument to use a reflection of the electromagnetic signals at the plurality of different depths to dynamically generate a time sequence of images of properties of the acoustic waves interacting with the electromagnetic signals including subsurface images of scatterers of the scattered wave field, and maps elastic wave fields of the acoustic waves; and a processor that analyzes dynamic multi-wave data of the time sequence of the images to quantify spatial variations in the mechanical and viscoelastic properties of the subsurface and uses positions of the scatterers of the scattered wave field when comparing successive images of the time sequence of images.

2. The system of claim 1, wherein the non-contact acoustic source generates the acoustic waves including a combination of compressional (P) waves, shear (S) waves, and propagating waves via a thermoelastic effect directed at a focus region at the subsurface.

3. The system of claim 1, wherein the non-contact acoustic source includes a laser that generates a plurality of acoustic surface waves at a frequency range at the surface or subsurface.

4. The system of claim 1, wherein the non-contact acoustic source generates one or more subsurface acoustic modes in addition to Rayleigh waves.

5. The system of claim 1, wherein perturbations resulting from an output of the acoustic waves by the non-contact acoustic source are measured at the plurality of different depths by the radar instrument and form a depth profile.

6. The system of claim 1, wherein the system is constructed and arranged for a characterization and monitoring of geologic hazards, infrastructure, and fluids.

7. The system of claim 1, wherein the radar instrument includes a surface penetrating radar (SPR) apparatus that performs a rapid imaging of the scattered wave field of the acoustic waves affecting the probing electromagnetic signals.

8. The system of claim 7, wherein the SPR apparatus interacts with the acoustic waves by capturing or freezing wave motion of the acoustic waves.

9. The system of claim 7, wherein the SPR apparatus detects selected displacement signals of the probing electromagnetic signals and displays them versus time.

10. The system of claim 1, further comprising a trigger device, wherein the non-contact acoustic source includes a sensing unit that senses the acoustic waves from the acoustic source, and outputs a pulse to the trigger device.

11. A system for near-surface subsurface imaging for detecting and characterizing subsurface heterogeneities, comprising:
a laser that excites a plurality of acoustic waves that travel through a surface at a plurality of different depths of a subsurface and at different frequencies and produces a scattered wave field in response to an insonification of subsurface features;
a subsurface radar apparatus that senses vibrational modes of the subsurface below the surface by outputting propagating electromagnetic signals through the surface that interact with and are affected by the scattered wave field of the surface acoustic waves at one or more depths below the surface; and
an imaging device that communicates with the subsurface radar apparatus to use a reflection of the electromagnetic signals at the one or more depths to dynamically generate a time sequence of images of properties of the acoustic waves interacting with the electromagnetic signals including subsurface images of scatterers of the scattered wave field, and maps elastic wave fields of the acoustic waves propagating in the subsurface at the one or more different depths.

12. The system of claim 11, wherein the laser controls an output of laser energy into different waves at a frequency range at the surface or subsurface by one or more of a spot size, pulse length, energy and triggering of the laser.

13. The system of claim 11, wherein the laser includes a Q-type switched laser.

14. The system of claim 11, wherein perturbations resulting from an output of the laser are measured at a plurality of different depths in the subsurface by scattered radar signals generated by the subsurface radar apparatus and form a depth profile.

15. The system of claim 14, wherein the depth profile provides for a characterization and monitoring of geologic hazards, infrastructure, and fluids.

16. A method for determining a subsurface feature, comprising:
transmitting at least one propagating acoustic wave at a surface location that travels through a surface at a plurality of different depths of a subsurface and at different frequencies and produces a scattered wave field in response to an insonification of subsurface features;
transmitting a synchronized radar signal that interacts with the at least one propagating acoustic wave;
sensing a plurality of perturbations in response to the output of the at least one acoustic wave at different depths in a subsurface at or near the surface location;
determining a plurality of measurements of a radar wave resulting from the interaction of the synchronized radar signal and the at least one acoustic wave at the different depths;
comparing data of the plurality of measurements to a computational elastic or viscoelastic acoustic propagation model for depths corresponding to the different depths of the at least one acoustic wave in the subsurface;
using a reflection of electromagnetic signals at the plurality of different depths to dynamically generate a time sequence of images of properties of the acoustic waves interacting with the electromagnetic signals including subsurface images of scatterers of the scattered wave field and using positions of the scatterers of the scattered wave field when comparing successive images of the time sequence of images; and
determining in response to the comparison a set of elastic or viscoelastic parameters for the surface location.

17. The method of claim 16, further comprising combining radar-based measured displacements with the computational elastic or viscoelastic propagation model for describing displacements of the at least one acoustic waves at the different depths to infer or derive elastic and viscoelastic parameters of the subsurface in three dimensions.

18. The method of claim 16, wherein sensing the plurality of perturbations includes measuring the scatterers of the synchronized radar signal that interact with the at least one acoustic waves at the one or more depths of the subsurface below the surface.

19. The method of claim 16, wherein the at least one acoustic wave includes Rayleigh waves having an amplitude that decreases with depth and depends on elasticity characteristics of the subsurface.

* * * * *